US011637424B2

(12) United States Patent
Hong

(10) Patent No.: US 11,637,424 B2
(45) Date of Patent: Apr. 25, 2023

(54) ELECTRICAL STRESS PROTECTION CIRCUIT AND ELECTRONIC DEVICE INCLUDING THE SAME

(71) Applicant: Anapass Inc., Seoul (KR)

(72) Inventor: Byung Il Hong, Incheon (KR)

(73) Assignee: Anapass Inc., Seoul (KR)

(*) Notice: Subject to any disclaimer, the term of this patent is extended or adjusted under 35 U.S.C. 154(b) by 0 days.

(21) Appl. No.: 17/165,601

(22) Filed: Feb. 2, 2021

(65) Prior Publication Data

US 2021/0273448 A1 Sep. 2, 2021

(30) Foreign Application Priority Data

Mar. 2, 2020 (KR) ........................ 10-2020-0026180

(51) Int. Cl.
*H02H 9/04* (2006.01)
*H02H 1/00* (2006.01)
*G09G 3/20* (2006.01)

(52) U.S. Cl.
CPC .......... *H02H 9/046* (2013.01); *H02H 1/0007* (2013.01); *G09G 3/20* (2013.01); *G09G 2330/04* (2013.01)

(58) Field of Classification Search
CPC ........ H02H 1/0007; H02H 9/04; H02H 9/046; G09G 3/20; G09G 2330/04; G09G 2330/06
USPC ............................................................ 361/56
See application file for complete search history.

(56) References Cited

U.S. PATENT DOCUMENTS 7,764,475 B2 * 7/2010 Sung .................. H01L 27/0266 361/91.1
9,825,022 B2 * 11/2017 Chen .................. H01L 27/0266
10,879,232 B2 12/2020 Lai et al.
(Continued)

FOREIGN PATENT DOCUMENTS

JP 2007-258998 A 10/2007
JP 2014-103664 A 6/2014
(Continued)

OTHER PUBLICATIONS

Taiwanese Office Action for related TW Application No. 110100616 dated Sep. 3, 2021 from Taiwan Intellectual Property Office.
(Continued)

*Primary Examiner* — Kevin J Comber
(74) *Attorney, Agent, or Firm* — Paratus Law Group, PLLC

(57) ABSTRACT

An electrical stress protection circuit includes a detection circuit including a first transistor connected to a driving voltage rail and turned on when electrical stress is provided, and a bypass transistor turned on in response to a signal output when the first transistor is turned on and configured to provide electrical stress to a reference voltage rail. An electronic device configured to perform a predetermined function, includes a detection circuit including a first transistor connected to a driving voltage rail and turned on when electrical stress is provided, and an electrical stress protection circuit including a bypass transistor turned on in response to a signal output when the first transistor is turned on and configured to provide electrical stress to a reference voltage rail.

17 Claims, 11 Drawing Sheets

(56) References Cited

U.S. PATENT DOCUMENTS

| | | | | |
|---|---|---|---|---|
| 2010/0157493 | A1* | 6/2010 | Guedon | H01L 27/0285 361/56 |
| 2012/0007648 | A1* | 1/2012 | Vashchenko | H02H 9/046 327/321 |
| 2014/0139963 | A1* | 5/2014 | Stockinger | H03K 19/00315 361/111 |
| 2014/0353727 | A1* | 12/2014 | Etherton | H01L 27/0296 438/129 |
| 2015/0162746 | A1* | 6/2015 | Ikeda | H02H 9/046 361/56 |
| 2017/0125085 | A1 | 5/2017 | Kim et al. | |
| 2019/0006842 | A1* | 1/2019 | Watanabe | H02H 9/046 |

FOREIGN PATENT DOCUMENTS

| | | | |
|---|---|---|---|
| JP | 2015-115339 | A | 6/2015 |
| JP | 2018-157217 | A | 10/2018 |
| TW | 201906268 | A | 2/2019 |
| TW | 201924018 | A | 6/2019 |

OTHER PUBLICATIONS

Japanese Office Action for related JP application No. 2021-024130 dated Feb. 22, 2022 from Japanese Patent Office.

* cited by examiner

ELECTRICAL STRESS PROTECTION CIRCUIT AND ELECTRONIC DEVICE INCLUDING THE SAME

CROSS-REFERENCE TO RELATED APPLICATION

This application claims priority to Korean Patent Application No. 10-2020-0026180 (filed on Mar. 2, 2020), which is hereby incorporated by reference in its entirety.

BACKGROUND

The present invention relates to an electrical stress protection circuit and an electronic device including the same.

Electrical stress input through a driving voltage rail and/or a reference voltage rail may include electrostatic discharge (ESD) and electrical over stress (EOS). ESD means electrostatic discharge, is a discharge phenomenon in which a finite amount of charges moves rapidly between two objects with different potentials and has a voltage of 500 V or more for several hundred picoseconds (ps) to several nanoseconds (ns).

EOS refers to damage which can occur when a voltage exceeding a specification limit is applied to an electronic device, continues for tens to hundreds of microseconds to one millisecond, and has a voltage that is lower than the voltage of ESD.

Since a voltage of ESD as high as thousands of volts is applied for a short period of time, it is important to instantly bypass the voltage and a current. Since a voltage of EOS that is lower than the voltage of ESD is applied but is applied for a relatively long period of time, a breakdown of a thin insulating layer, such as a gate oxide layer of a metal oxide semiconductor (MOS) transistor constituting a circuit, may occur, and thus it is important to block an inflow of the EOS to an internal circuit.

SUMMARY

A protection circuit according to the related art reduces a peak of electrostatic discharge (ESD) using a resistor and a capacitor which are connected in series and delays the ESD to direct the ESD to flow to a reference voltage (VSS) rail. However, a voltage of electrical over stress (EOS) is not rapidly changed when compared with a voltage of ESD. Thus, a resistor having a large resistance value and a capacitor having large capacitance should be used. However, in this case, there is a disadvantage in that performance against ESD is degraded.

The present invention is to solve the above described problems of the related art. The present invention is directed to providing a circuit capable of effectively protecting an electronic device from EOS and ESD.

According to an aspect of the present invention, there is provided an electrical stress protection circuit including a detection circuit including a first transistor connected to a driving voltage rail and turned on when electrical stress is provided, and a bypass circuit including a bypass transistor configured to provide the electrical stress to a reference voltage rail when the electrical stress is applied.

According to another aspect of the present invention, there is provided an electronic device configured to perform a predetermined function, which includes a detection circuit including a first transistor connected to a driving voltage rail and turned on when electrical stress is provided, and an electrical stress protection circuit including a bypass transistor turned on in response to a signal output when the first transistor is turned on and configured to provide electrical stress to a reference voltage rail.

BRIEF DESCRIPTION OF THE DRAWINGS

The above and other objects, features and advantages of the present invention will become more apparent to those skilled in the art by describing in detail exemplary embodiments thereof with reference to the accompanying drawings, in which.

DETAILED DESCRIPTION

First Embodiment

Figure 1:
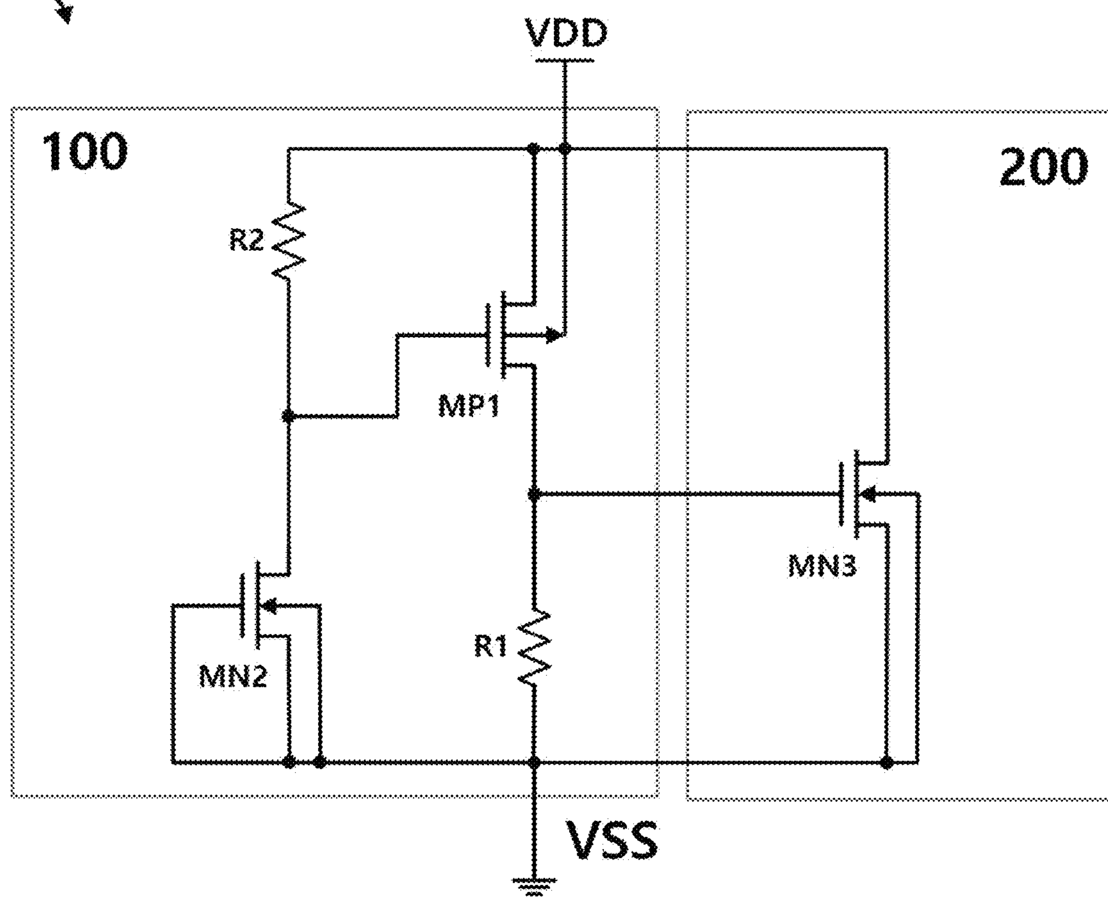
FIG. 1 is a schematic circuit diagram illustrating an electrical stress protection circuit according to one embodiment.

Hereinafter, electrical stress is used to include both electrical over stress (EOS) and electrostatic discharge (ESD). Hereinafter, a method of forming an electrical stress protection circuit 10 according to the present embodiment will be described with reference to the accompanying drawings. FIG. 1 is a schematic circuit diagram illustrating the electrical stress protection circuit 10 according to the present embodiment. Referring to FIG. 1, the electrical stress protection circuit 10 according to the present embodiment includes a detection circuit 100 including a first transistor MP1 connected to a driving voltage rail VDD and turned on when electrical stress is provided, and a bypass transistor MN3 turned on in response to a signal which is output when the first transistor MP1 is turned on and configured to provide the electrical stress to a reference voltage rail VSS.

The detection circuit 100 includes the first transistor MP1 connected to the driving voltage rail VDD. In the embodiment illustrated in FIG. 1, the first transistor MP1 may be a p-type transistor, and a source electrode and a body electrode thereof may be connected to the driving voltage rail VDD. A drain electrode of the first transistor MP1 may be connected to a first current limiting resistor R1. Although the first current limiting resistor R1 has been illustrated as a single resistor, in another embodiment, the first current limiting resistor R1 may include a plurality of resistors connected in series, in parallel, or in series-parallel.

In the embodiment illustrated in FIG. 1, the detection circuit 100 may further include a second transistor MN2. For example, the second transistor MN2 may be an n-type transistor, and a body electrode and a source electrode of the second transistor MN2 may be connected to the reference voltage rail VSS. A drain electrode of the second transistor MN2 may be connected to a second current limiting resistor R2. Although the second current limiting resistor R2 has been illustrated as a single resistor, in another embodiment, the second current limiting resistor R2 may include a plurality of resistors connected in series, in parallel, or in series-parallel.

A bypass circuit 200 includes the bypass transistor MN3 which is turned on to bypass electrical stress to the reference voltage rail VSS without providing the electrical stress to an internal circuit (not shown). In one embodiment, the bypass transistor MN3 is designed to have a size which is not broken down even when a voltage and/or a current due to ESD or EOS is applied and has a size that is greater than sizes of the first transistor MP1 and the second transistor MN2.

Figure 2:
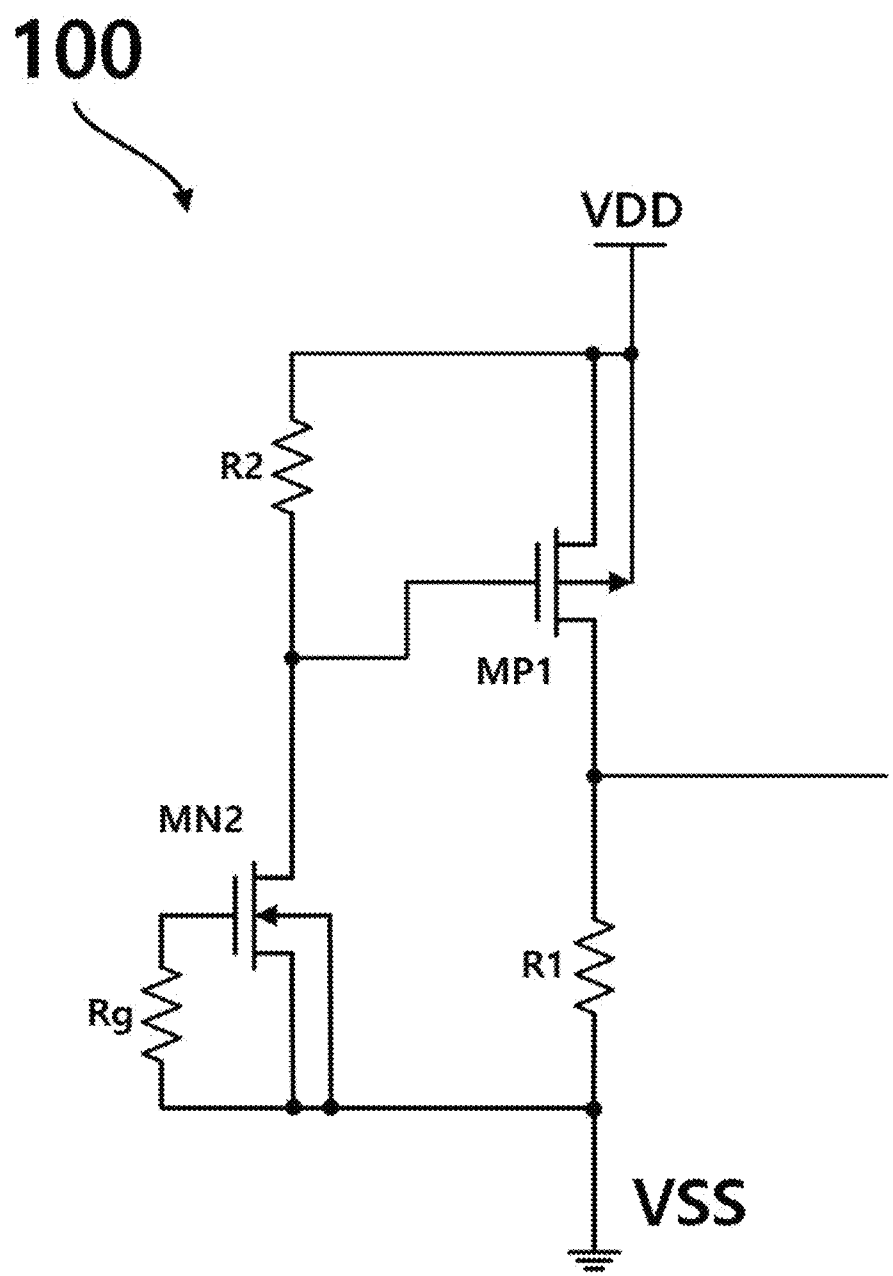
FIG. 2 is a circuit diagram illustrating another example of a detection circuit.

FIG. 2 is a circuit diagram illustrating another example of the detection circuit 100. Referring to FIG. 2, a gate electrode of a second transistor MN2 may be connected to a reference voltage rail VSS through a gate protection resistor Rg. The gate protection resistor Rg prevents a breakdown of a gate insulating film of the second transistor MN2 due to electrical stress provided through the reference voltage rail VSS.

Figure 3A:
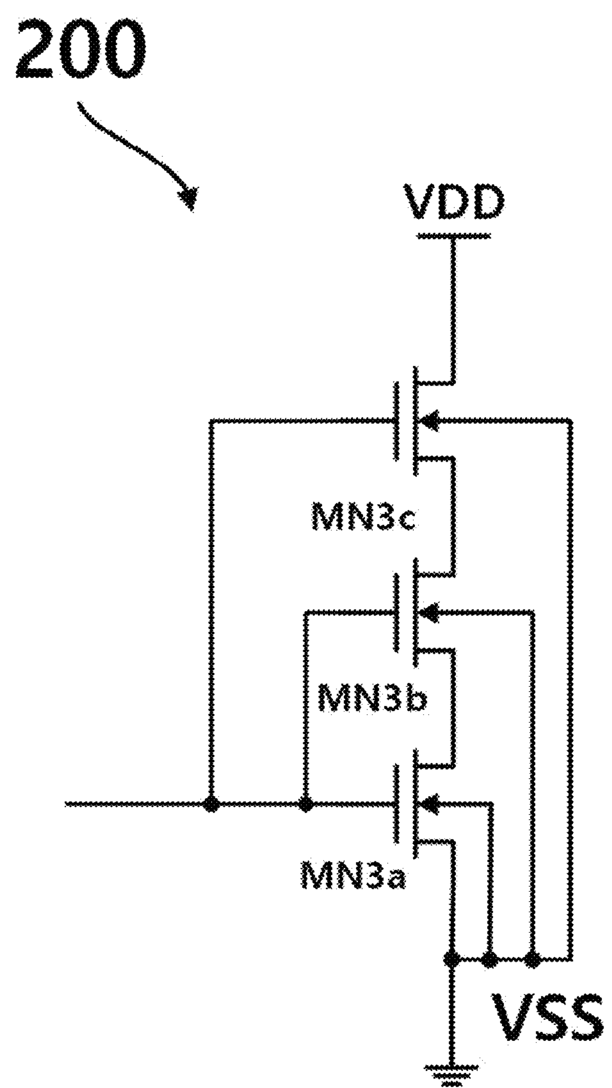
FIGS. 3A to 3C are diagrams illustrating examples of a bypass circuit.
Figure 3B:
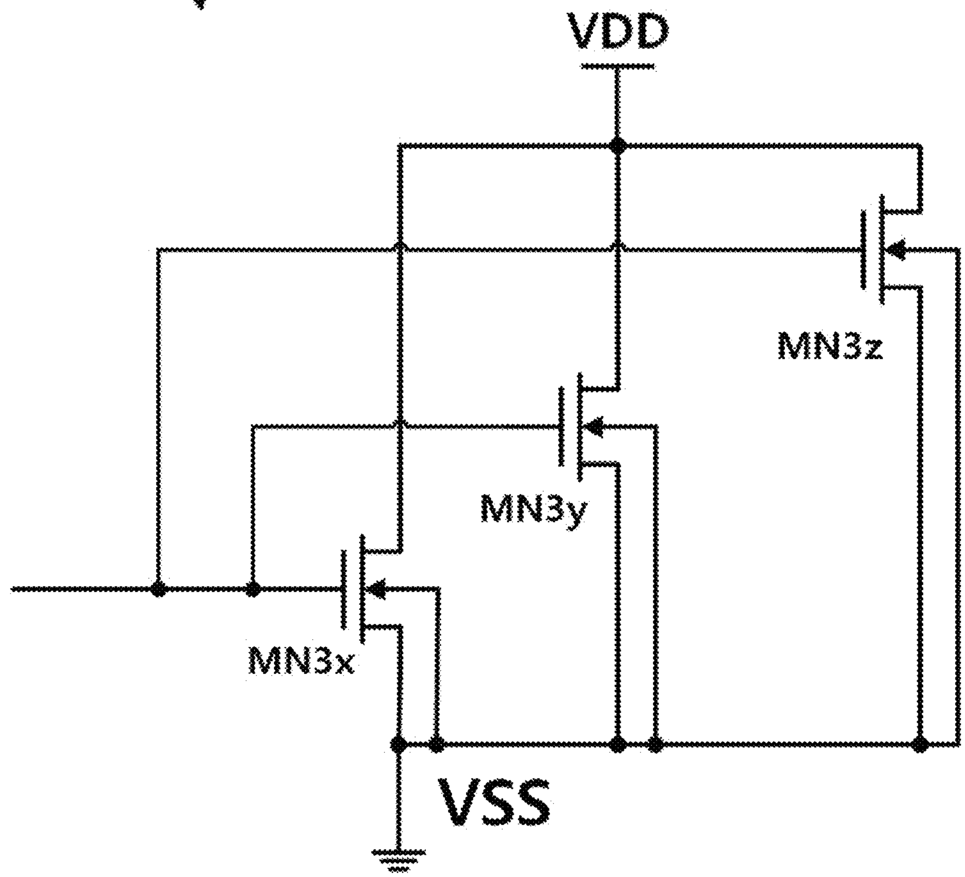
Figure 3C:
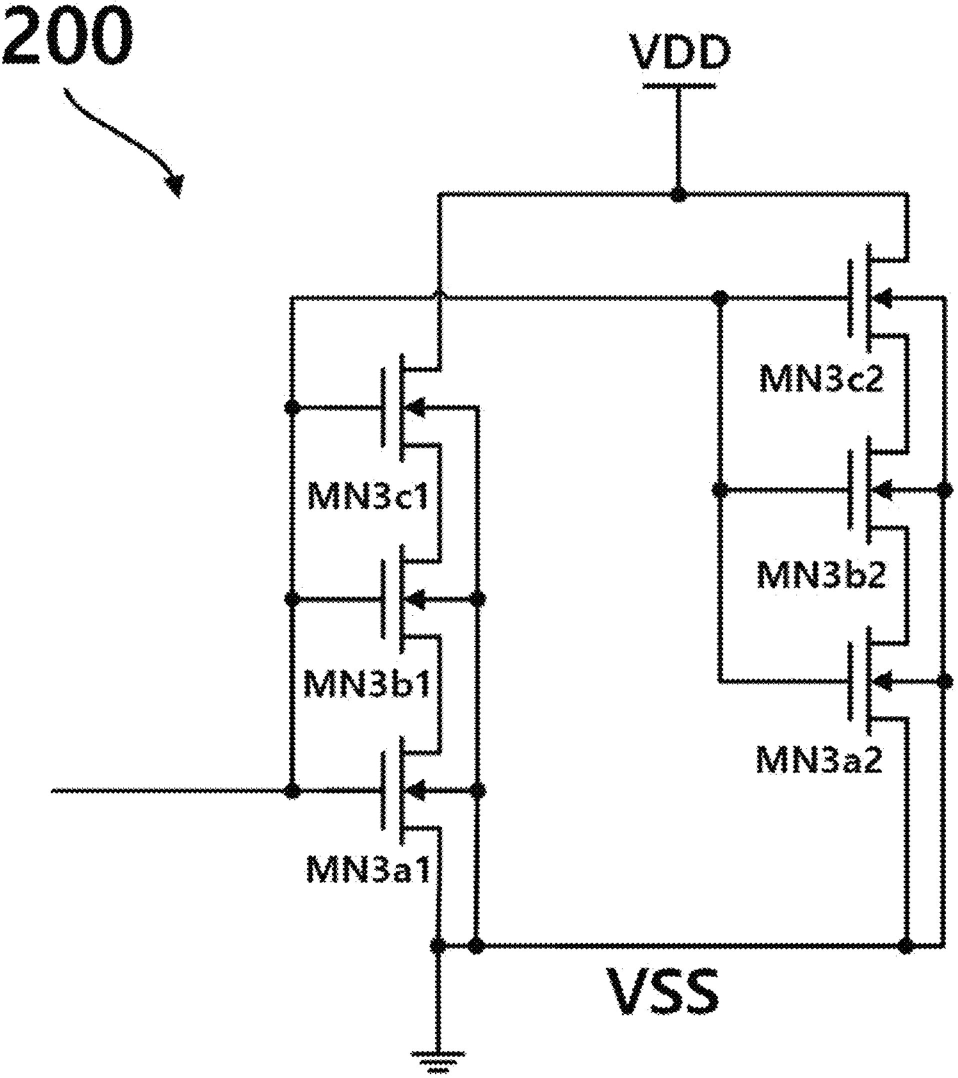

FIGS. 3A to 3C are diagrams illustrating examples of the bypass circuit 200. Although the bypass circuit 200 has been illustrated as including a single bypass transistor MN3 in the embodiment illustrated in FIG. 1, according to the example illustrated in FIG. 3A, the bypass circuit 200 may include a plurality of bypass transistors MN3*a*, MN3*b*, and Mn3*c* which are connected in series so as to prevent a breakdown of a bypass transistor at a high voltage. According to the example illustrated in FIG. 3B, the bypass circuit 200 may include a plurality of bypass transistors MN3*x*, MN3*y*, and MN3*z* which are connected in parallel so as to prevent a breakdown of a bypass transistor due to a large current. In addition, according to the example illustrated in FIG. 3C, the bypass circuit 200 may have a structure in which a plurality of bypass transistors connected in series are connected in parallel.

Hereinafter, the operation of the electrical stress protection circuit 10 having the above configuration will be described. Referring to FIGS. 1 to 3, when electrical stress is applied through the driving voltage rail VDD, a current is applied to the source electrode of the first transistor MP1, and when a voltage due to the electrical stress exceeds a predetermined threshold voltage, an avalanche breakdown occurs in a PN junction between a source region and a channel. Thus, a parasitic bipolar transistor (parasitic BJT) formed in the first transistor MP1 is turned on and thus a snapback phenomenon occurs so that the first transistor MP1 is turned on.

When electrical stress is applied through the driving voltage rail VDD, a parasitic BJT formed in the second transistor MN2 is also turned on and thus a snapback phenomenon occurs so that the second transistor MN2 is turned on.

As the second transistor MN2 is turned on, a voltage of the drain electrode of the second transistor MN2 drops to the reference voltage VSS, and the reference voltage VSS is provided to a gate electrode of the first transistor MP1 so that the first transistor MP1 is turned on. That is, as the electrical stress is provided, the first transistor MP1 is turned on due to the snap-back phenomenon and/or the second transistor MN2 is turned on due to the snap-back phenomenon so that the first transistor MP1 is turned on due to a voltage provided to the gate electrode of the first transistor MP1.

As the first transistor MP1 is turned on, a current path is formed from the driving voltage rail VDD to the reference voltage rail VSS. In order to prevent a breakdown of the first transistor MP1 due to an excessive current flowing through the first transistor MP1, the first current limiting resistor R1 is provided to limit the excessive current flowing through the first transistor MP1 so that the first transistor MP1 may be protected from the excessive current.

In addition, as the second transistor MN2 is turned on, a current path is formed from the driving voltage rail VDD to the reference voltage rail VSS. In order to prevent a breakdown of the second transistor MN2 due to an excessive current flowing through the second transistor MN2, the second current limiting resistor R2 is provided to limit the excessive current flowing through the second transistor MN2 so that the second transistor MN2 may be protected from the excessive current.

As the first transistor MP1 is turned on, the voltage of the drain electrode of the first transistor MP1 is formed in a high state and provided to a gate electrode of the bypass transistor MN3. Thus, the electrical stress applied through the driving voltage rail VDD is bypassed to the reference voltage rail VSS through the bypass transistor MN3. Consequently, the electrical stress is not introduced into an internal circuit of an electronic device so that the internal circuit of the electronic device is protected.

Second Embodiment

Figure 4:
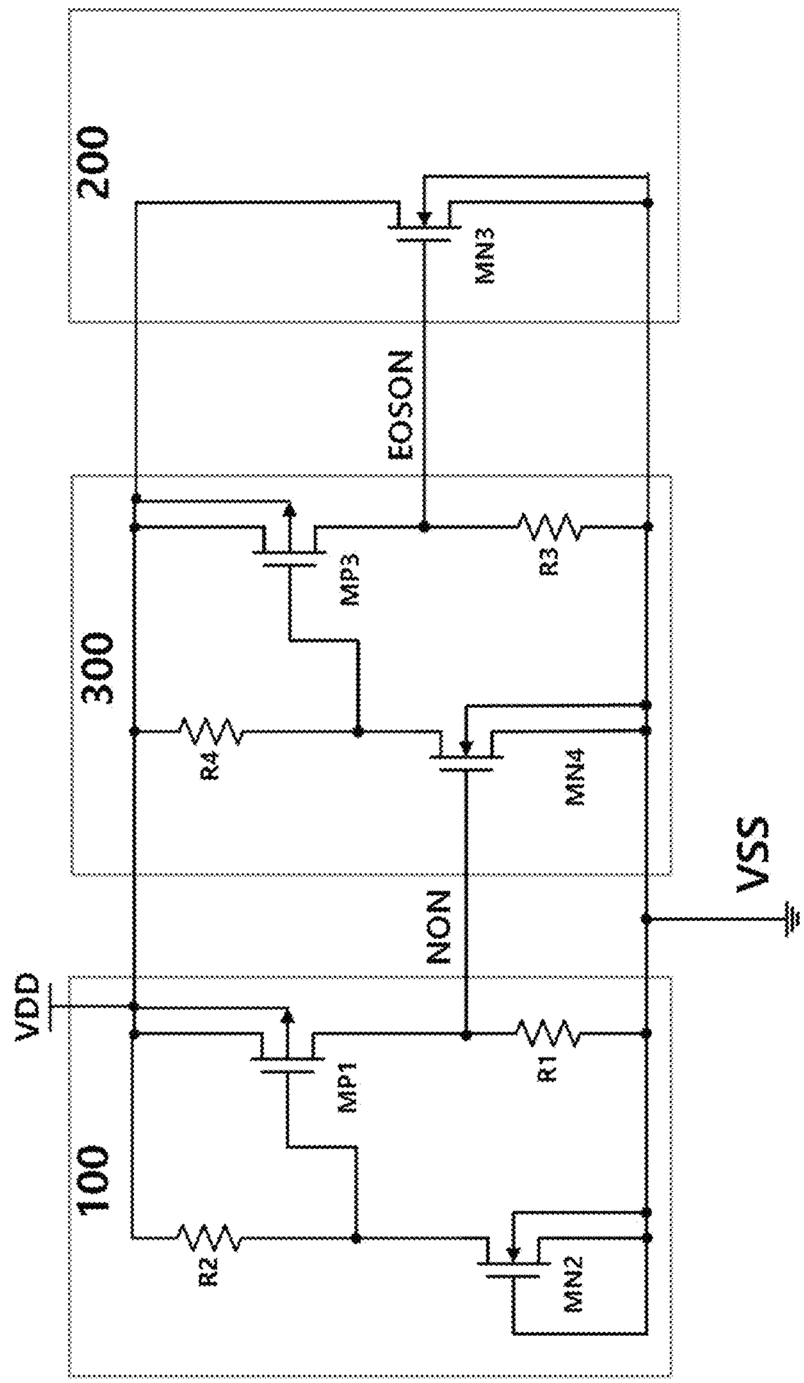
FIG. 4 is a schematic circuit diagram illustrating an electrical stress protection circuit according to a second embodiment.

Hereinafter, a second embodiment will be described with reference to FIGS. 4 and 5. For concise and definite description, descriptions of components which are the same as or similar to those of the first embodiment will be omitted below. FIG. 4 is a schematic circuit diagram illustrating an electrical stress protection circuit according to a second embodiment. Referring to FIG. 4, an electrical stress protection circuit 20 of the second embodiment includes a detection circuit 100 including a first transistor MP1 connected to a driving voltage rail VDD and turned on when electrical stress is provided, a buffer 300 configured to buffer and output a detection signal NON which is detected and provided by the detection circuit 100, and a bypass circuit 200 including a bypass transistor MN3 that is turned on in response to a buffer signal EOSON and provide the electrical stress to a reference voltage rail VSS.

As an example, the buffer 300 may include a fourth transistor MN4 that is turned on by receiving the detection signal NON, and a third transistor MP3 that is turned on to output the buffer signal EOSON as the fourth transistor MN4 is turned on. In the illustrated example, the fourth transistor MN4 may be an n-type metal oxide semiconductor (NMOS) transistor, and the third transistor MP3 may be a p-type metal oxide semiconductor (PMOS) transistor. In addition, a connection between the third transistor MP3 and the fourth transistor MN4 which are included in the buffer 300 may be similar to a connection relationship of the detection circuit 100, and the sizes of the first transistor MP1 and the second transistor MN2 which are included in the detection circuit 100 may be different from each other.

Figure 5:
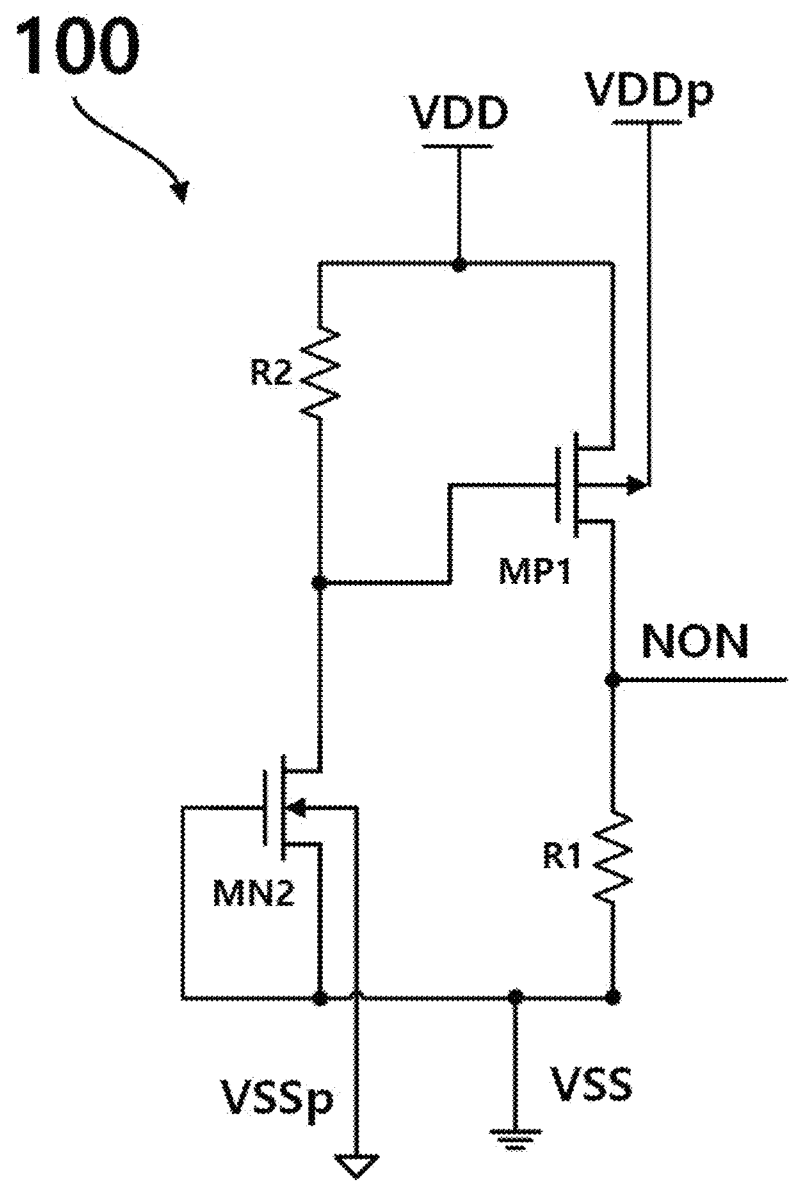
FIG. 5 is a schematic circuit diagram illustrating another example of a detection circuit.

FIG. 5 is a schematic circuit diagram illustrating another example of the detection circuit 100. Referring to FIG. 5, a source electrode of the first transistor MP1 of the detection circuit 100 may be connected to a voltage rail through which a driving voltage VDD is provided, and a body electrode of the first transistor MP1 may be connected to a voltage rail through which a second driving voltage VDDp is provided. In addition, a source electrode of the second transistor MN2 may be connected to a voltage rail through which a reference voltage VSS is provided, and a body electrode of the second transistor MN2 may be connected to a voltage rail through which a second reference voltage VSSp is provided.

The second driving voltage VDDp may be a voltage that is higher than the driving voltage VDD, and the second reference voltage VSSp may be a voltage that is lower than a reference voltage VSS. Since a voltage that is higher than the driving voltage VDD is provided to the body electrode of the first transistor MP1, a breakdown voltage of the first transistor MP1 is lowered. Thus, when electrical stress is provided to the first transistor MP1, a breakdown occurs even when a voltage applied between the source electrode and the drain electrode is low. Therefore, since the first transistor MP1 is turned on faster than when the driving voltage VDD is provided to the body electrode, electrical stress may be detected more quickly.

Similarly, since the second reference voltage VSSp that is lower than the reference voltage VSS is provided to the body electrode of the second transistor MN2, the voltage between the drain electrode and the source electrode, at which a breakdown occurs in the second transistor MN2, is lowered. Thus, when electrical stress is provided to the second transistor MN2, since a breakdown occurs even when the voltage applied between the source electrode and the drain electrode is low, the second transistor MN2 is turned on faster than when the reference voltage VSS is provided to the body electrode so that electrical stress may be detected more quickly.

As an example, the second driving voltage VDDp may have a voltage value which is at least 5% higher, and preferably, at least 10% higher than the driving voltage VDD. In addition, the second reference voltage VSSp may have a voltage value which is at least 5% lower, and preferably, at least 10% lower than the reference voltage VSS.

In the embodiment illustrated in FIG. 5, it has been illustrated that the second driving voltage VDDp and the second reference voltage VSSp are provided to the body electrode of the first transistor MP1 and the body electrode of the second transistor MN2, respectively. However, in a non-illustrated embodiment, the second driving voltage VDDp may be provided to only the body electrode of the first transistor MP1, and in another non-illustrated embodiment, the second reference voltage VSSp may be provided to only the body electrode of the second transistor MN2.

Hereinafter, the electrical stress protection circuit 20 will be described with reference to FIGS. 4 and 5. When electrical stress is provided, a breakdown occurs in the first transistor MP1 and/or the second transistor MN2 which are/is included in the detection circuit 100, and thus the first transistor MP1 and/or the second transistor MN2 are/is turned on. When the first transistor MP1 and/or the second transistor MN2 is turned on, the detection circuit 100 outputs the detection signal NON.

The fourth transistor MN4 included in the buffer 300 receives the detection signal NON to be turned on, and thus the third transistor MP3 is turned on. Since the third transistor MP3 is turned on, the buffer 300 outputs the buffer signal EOSON to the bypass circuit 200.

As an example, when electrical stress is provided, the third transistor MP3 and/or the fourth transistor MN4 which are/is included in the buffer 300 may be turned on to output the buffer signal EOSON.

As an example, the third transistor MP3 and the fourth transistor MN4 which are included in the buffer 300 may have sizes that are greater than the sizes of the first transistor MP1 and the second transistor MN2 which are included in the detection circuit 100 and may have current driving performance higher than the current driving performance of the first transistor MP1 and the second transistor MN2. Consequently, a rising time of the buffer signal EOSON output from the buffer 300 may be faster than a rising time of the detection signal NON output from the detection circuit 100 so that there is provided an advantage in that electrical stress may be detected more quickly.

Figure 6:
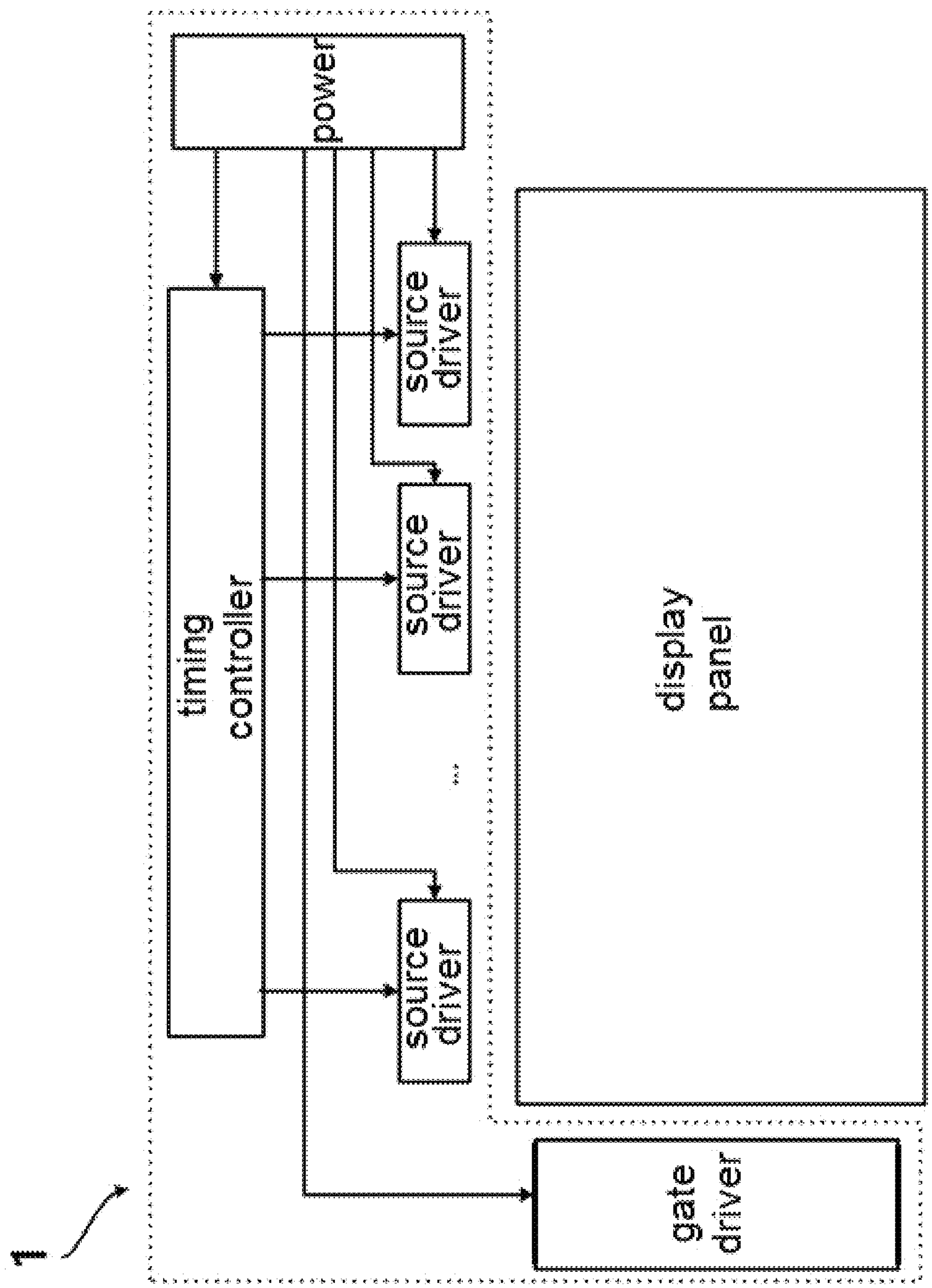
FIG. 6 is a schematic diagram illustrating a display device including the electrical stress protection circuit according to the present embodiment.

FIG. 6 is a schematic diagram illustrating a display device 1 including the electrical stress protection circuit 10 according to the present embodiment. Referring to FIG. 6, the display device 1 includes a display panel, a gate driver for driving the display panel, a source driver, and a timing controller. A power supply provides driving power to the gate driver, the source driver, and the timing controller.

The power supply may be a power supply device such as a switch mode power supply (SMPS) which receives power from the outside of the display device 1, converts the power into direct current, and provides the direct current to the gate driver, the source driver, and the timing controller.

Electrical stress may be provided to the power supply and provided to the gate driver, the source driver, and the timing controller through the driving voltage rail VDD and the reference voltage rail VSS to which the power supply provides the power. The electrical stress protection circuit 20 according to the present embodiment may be included in the power supply, the gate driver, the source driver, and the timing controller which are included in the display device 1 to prevent the occurrence of a failure due to the electrical stress.

Simulation Example

Figure 7A:
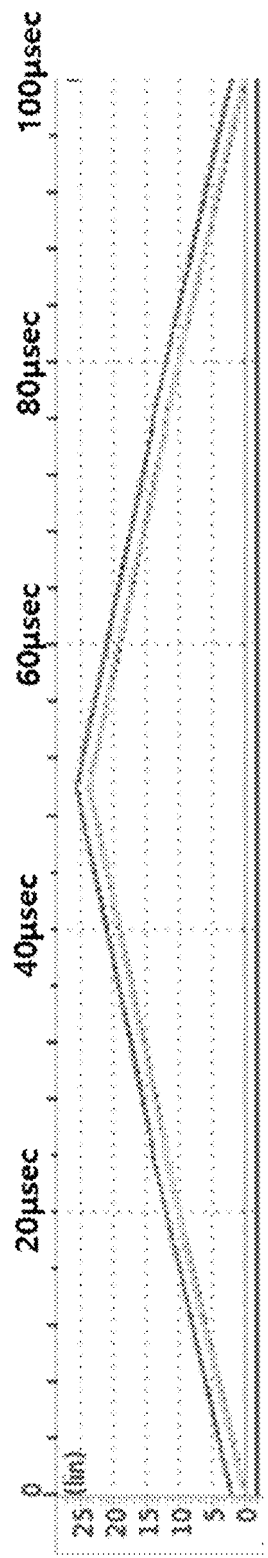
FIG. 7A is a graph showing electrical stress modeled in a triangular wave shape.

Hereinafter, a simulation result of Simulation Example will be described with reference to FIGS. 7A to 7G. FIG. 7A is a graph showing electrical stress modeled in a triangular wave shape. In FIG. 7A, the electrical stress is increased from zero V to 25 V for 50 μs, i.e., increased from zero V to 25 V in the range of zero μs to 50 μs, and decreased from 25 V to zero V in the range of 50 μs to 100 μs.

In the electrical stress shown in FIG. 7A, electrical stress provided through the second driving voltage VDDp has a larger value, and electrical stress provided through the driving voltage VDD was set to be lower by as much as 2 V. In addition, among reference voltages, a reference voltage having a larger voltage value was the reference voltage VSS, and the second reference voltage VSSp was set to be lower than the reference voltage VSS by as much as 2 V.

Figure 7B:
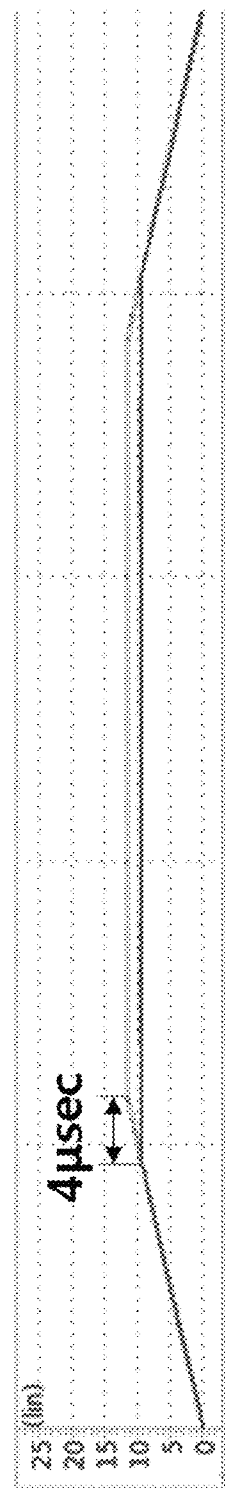
FIG. 7B is a graph showing variations in voltage of a driving voltage rail and a second driving voltage rail.

FIG. 7B is a graph showing variations in voltage of a driving voltage rail and a second driving voltage rail. Referring to FIG. 7B, when the second driving voltage VDDp and the second reference voltage VSSp were used, it can be confirmed that the electrical stress was detected 4 μs faster than when the second driving voltage VDDp and the second reference voltage VSSp were not used, and thus a breakdown occurred at a voltage of 9.6 V and the voltage was clamped. When the driving voltage VDD and the reference voltage VSS were used, it can be confirmed that a breakdown occurred at a voltage of 11.6 V and the voltage was clamped.

Figure 7C:
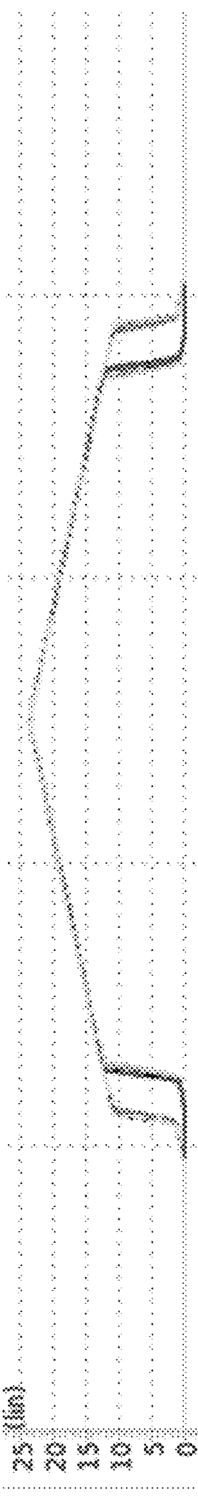
FIG. 7C is a graph showing a detection signal (NON) output from the detection circuit.
Figure 7D:
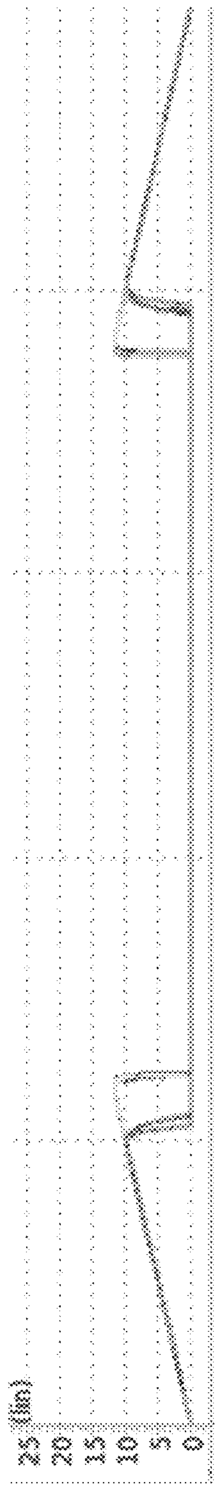
FIG. 7D is a graph showing internal signals of a buffer.

FIG. 7C is a graph showing the detection signal NON output from the detection circuit 100, and FIG. 7D is a graph showing internal signals of the buffer 300. Referring to FIGS. 7C and 7D, when the second driving voltage VDDp and the second reference voltage VSSp were used, it can be confirmed that the detection circuit 100 detected electrical stress 4 μs faster than when the second driving voltage VDDp and the second reference voltage VSSp were not used, and thus a rising detection signal NON was output.

Figure 7E:
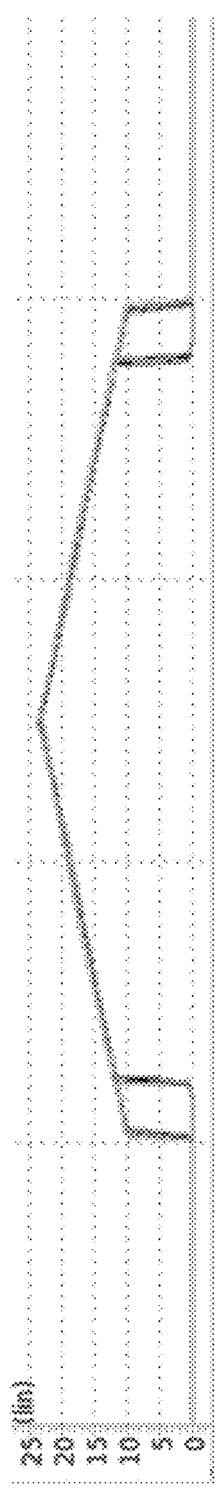
FIG. 7E is a graph showing a buffer signal (ESDON) output from the buffer.

FIG. 7E is a graph showing the buffer signal EOSON output from the buffer 300. Referring to FIG. 7E, it can be seen that a rising speed and a dropping speed were faster than those of the detection signal NON illustrated in FIG. 7C. Consequently, it can be confirmed that the buffer 300 buffered the output signal of the detection circuit 100 to provide the buffered output signal to the bypass circuit 200 so that an electrical signal was quickly bypassed to the reference voltage rail.

Figure 7F:
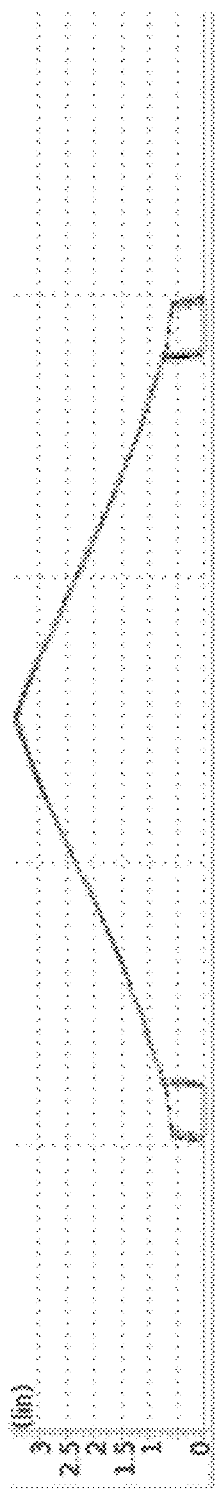
FIG. 7F is a graph showing a rough shape of a current flowing through the bypass circuit.
Figure 7G:
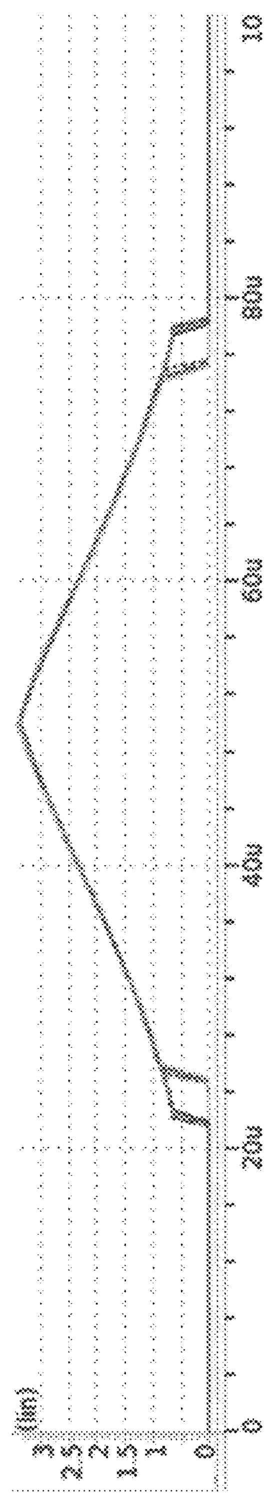
FIG. 7G is a graph showing a rough shape of a current flowing through the bypass circuit when the bypass circuit is driven in response to the detection signal (NON) output from the detection circuit.

FIG. 7F is a graph showing a rough shape of a current flowing through the bypass circuit 200, and FIG. 7G is a graph showing a rough shape of a current flowing through the bypass circuit 200 when the bypass circuit 200 is driven in response to the detection signal NON output from the detection circuit 100. Referring to FIGS. 7F and 7G, when the bypass circuit 200 was driven in response to the buffer signal EOSON output from the buffer 300, it can be confirmed that the bypass transistor MN3 was turned on faster, and the rising speed and the dropping speed of the current were faster.

In accordance with the electrical stress protection circuit according to the present invention, an advantage of effectively protecting an electronic device from EOS and ESD can be provided.

In order to aid understanding of the present invention, the description has been made with reference to the embodiments shown in the drawings, but these embodiments are for implementation and are merely illustrative. Thus, those skilled in the art will appreciate that various modifications and equivalent other embodiments can be derived without departing from the scope of the present invention. Therefore, the true technical scope of the present invention should be defined by the appended claims.

What is claimed is:

1. An electrical stress protection circuit comprising:
- a detection circuit including a first transistor connected to a driving voltage rail and turned on when electrical stress is provided;
- a bypass circuit including a plurality of bypass transistors configured to provide the electrical stress to a reference voltage rail when the electrical stress is applied; and
- a buffer configured to receive and buffer a detection signal and output the buffered detection signal,
- wherein the plurality of bypass transistors are connected in any one of series and series-parallel manner,
- wherein the detection circuit further includes a second transistor connected to the reference voltage rail and turned on due to a breakdown when the electrical stress is provided,
- wherein a gate electrode of the second transistor is connected to the reference voltage rail through a gate protection resistor,
- wherein the buffer includes:
  - a fourth transistor turned on in response to the detection signal; and
  - a third transistor turned on in response to a signal output when the fourth transistor is turned on, and
- wherein a voltage that is higher than a voltage provided to the driving voltage rail is provided to a body electrode of the first transistor.

2. The electrical stress protection circuit of claim 1, wherein the first transistor is turned on due to a breakdown when the electrical stress is provided or is turned on due to a voltage formed when the second transistor is turned on.

3. The electrical stress protection circuit of claim 1, wherein:
- the first transistor is a p-type metal oxide semiconductor (MOS) transistor; and
- the second transistor is an n-type MOS transistor.

4. The electrical stress protection circuit of claim 1, wherein a size of the plurality of bypass transistors is greater than a size of the first transistor.

5. The electrical stress protection circuit of claim 1, wherein:
- the first transistor is electrically connected to the reference voltage rail through a first current limiting resistor; and
- the first current limiting resistor limits a current flowing through the first transistor when the first transistor is turned on.

6. The electrical stress protection circuit of claim 1, wherein:
- the second transistor is electrically connected to the driving voltage rail through a second current limiting resistor; and
- the second current limiting resistor limits a current flowing through the second transistor when the second transistor is turned on.

7. The electrical stress protection circuit of claim 1, wherein a voltage that is lower than a voltage provided to the reference voltage rail is provided to a body electrode of the second transistor.

8. The electrical stress protection circuit of claim 1, wherein the plurality of bypass transistors are connected in parallel.

9. An electronic device configured to perform a predetermined function, comprising:
- a detection circuit including a first transistor connected to a driving voltage rail and turned on when electrical stress is provided;
- an electrical stress protection circuit including a plurality of bypass transistors turned on in response to a signal output when the first transistor is turned on and configured to provide electrical stress to a reference voltage rail; and
- a buffer configured to receive and buffer a detection signal and output the buffered detection signal,
- wherein the plurality of bypass transistors are connected in any one of series and series-parallel manner,
- wherein the detection circuit further includes a second transistor connected to the reference voltage rail and turned on due to a breakdown when the electrical stress is provided,
- wherein a gate electrode of the second transistor is connected to the reference voltage rail through a gate protection resistor,
- wherein the buffer includes:
  - a fourth transistor turned on in response to the detection signal; and
  - a third transistor turned on in response to a signal output when the fourth transistor is turned on, and wherein a voltage that is higher than a voltage provided to the driving voltage rail is provided to a body electrode of the first transistor.

10. The electronic device of claim 9, wherein the first transistor is turned on due to a breakdown when the electrical stress is provided or is turned on due to a voltage formed when the second transistor is turned on.

11. The electronic device of claim 9, wherein:

the first transistor is a p-type metal oxide semiconductor (MOS) transistor; and the second transistor is an n-type MOS transistor.

12. The electronic device of claim 9, wherein a size of the plurality of bypass transistors is greater than a size of the first transistor.

13. The electronic device of claim 9, wherein the first transistor is electrically connected to the reference voltage rail through a first current limiting resistor; and the first current limiting resistor limits a current flowing through the first transistor when the first transistor is turned on.

14. The electronic device of claim 9, wherein:

the second transistor is electrically connected to the driving voltage rail through a second current limiting resistor; and the second current limiting resistor limits a current flowing through the second transistor when the second transistor is turned on.

15. The electronic device of claim 9, wherein a voltage that is lower than a voltage provided to the reference voltage rail is provided to a body electrode of the second transistor.

16. The electronic device of claim 9, wherein the electronic device is a display device.

17. The electronic device of claim 16, wherein the electrical stress protection circuit is included in one or more among a power supply, a source driver, a gate driver, and a timing controller of the display device.

* * * * *